United States Patent
Ioup et al.

(10) Patent No.: US 7,791,616 B2
(45) Date of Patent: Sep. 7, 2010

(54) METHOD FOR EFFICIENTLY TRANSFORMING A RASTER IMAGE FROM ONE MAP PROJECTION TO ANOTHER MAP PROJECTION

(75) Inventors: Elias Z K Ioup, New Orleans, LA (US); John T Sample, Diamondhead, MS (US); Hillary C Mesick, Long Beach, MS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 736 days.

(21) Appl. No.: 11/673,363

(22) Filed: Feb. 9, 2007

(65) Prior Publication Data

US 2007/0188516 A1 Aug. 16, 2007

Related U.S. Application Data

(60) Provisional application No. 60/774,807, filed on Feb. 10, 2006.

(51) Int. Cl.
*G09G 5/00* (2006.01)
(52) U.S. Cl. .................. 345/606; 345/581; 345/619
(58) Field of Classification Search ............... None
See application file for complete search history.

(56) References Cited

U.S. PATENT DOCUMENTS 5,550,960 A * 8/1996 Shirman et al. ............. 345/582
6,484,118 B1 * 11/2002 Govari ....................... 702/150
7,327,309 B2 * 2/2008 Wimmer .................... 342/185
2005/0031197 A1 2/2005 Knopp

OTHER PUBLICATIONS

Neer Cartography, "Digital Orthophoto Quads", [retrieved on Feb. 9, 2007], retrieved from the internet <URL: http://www.mckinleyville.com/cart/cabinet/cab_doq.html>.
U.S.G.S., "Digital Orthophoto Quadrangles", Fact Sheet 057-01, May 2001, [online], [retrieved on May 21, 2007], retrieved from the internet <URL: http://erg.usgs.gov/isb/pubs/factsheets/fs05701.html>.
Sample, J.T., Ladner, R., Shulman, L., Ioup, E., Petry, F., Warner, E., Shaw, K., and McCreedy, F.P., "Enhancing the US Navy's GIDB Portal with Web Services", IEEE Internet Computing, Sep.-Oct. 2006, p. 53-59.

(Continued)

*Primary Examiner*—Kee M Tung
*Assistant Examiner*—Jwalant Amin
(74) *Attorney, Agent, or Firm*—Amy L. Ressing; Sally A. Ferrett (57) ABSTRACT

A method and system for efficiently converting an image from a first map projection to a second map projection image. The method includes precomputing coordinates in the first map projection for a subset of the total number of pixels in an empty second map projection image and subsequently, finding the first map projection coordinates of each of the remaining pixels by linear interpolation using the precomputed first map projection coordinates of the nearest surrounding precomputed pixels. A color is assigned to the second map projection image pixel with bilinear interpolation using color values of surrounding first map projection pixels. If the first map projection has fiducials, only the area within the fiducials is considered. An embodiment converts a USGS DOQ in UTM format into Geodetic coordinates.

23 Claims, 10 Drawing Sheets

OTHER PUBLICATIONS

Snyder, J.P., "Map Projections—A Working Manual", U.S. Geological Survey Professional Paper 1395, United States Government Printing Office, Washington, 1987, pp. 11-21 and 60-70.

Jain, S., Barclay, T., "Adding the EPSG:4328 Geographic Longitude-Latitude Projection to Terra Server", Technical Report MSR-TR-2003-56, Microsoft Research, Redmond, WA, 2003, pp. 1-12.

Mesick, H.C., Ioup, E.Z.K., and Sample, J.T., "A Faster Technique for the Transformation of Universal Transverse Mercator Projected Raster Images into a Geodetic Projection", Naval Research Laboratory, NRL/MR/7440-05-8867, Mar. 11, 2005, pp. 1-13.

\* cited by examiner

EQUATIONS FOR CONVERTING UTM COORDINATES TO GEODETIC COORDINATES

$\phi = \phi_1 - (N_1 \tan\phi_1 / R_1)[D^2/2 - (5+3T_1+10C_1^2-9\varepsilon^2)D^4/24 +$
$(61+90T_1+298C_1+45T_1^2-252\varepsilon^2-3C_1^2)D^6/720]$ $\lambda = \lambda_0 + [D - (1+2T_1+C_1)D^3/6 + (5-2C_1+28T_1-3C_1^2+8\varepsilon^2+24T_1^2)D^5/120]/\cos\phi$ $\phi_1 = \mu + (3e_1/2 - 27e_1^3/32+...)\sin 2\mu + (21e_1^2/16 - 55e_1^4/32+...)\sin 4\mu +$
$(151e_1^3/96+...)\sin 6\mu + (1097e_1^4/512-...)\sin 8\mu$ where $e_1 = [1-(1-e^2)^{1/2}]/[(1-e^2)^{1/2}]$ $\mu = M/[a(1-e^2/4 - 3e^4/64 - 5e^6/256-...)]$ $M = M_0 + y/k_0$ $\varepsilon^2 = e^2/(1-e^2)$ $C_1 = \varepsilon^2 \cos^2\phi_1$ $T_1 = \tan^2\phi_1$ $N_1 = a/(1-e^2\sin^2\phi_1)^{1/2}$ $R_1 = a/(1-e^2)/(1-e^2\sin^2\phi_1)^{3/2}$ $D = x/(N_1 k_0)$

FIG. 4A

EQUATIONS FOR CONVERTING GEODETIC COORDINATES TO UTM COORDINATES

$x = k_0 N [A + (1-T+C)A^3/6 + (5-18T+T^2+72T-58e^2)A^5/120]$ $y = k_0 \{M - M_0 + N \tan(\phi) [A^2/2 + (5-T+9C+4C^2)A^4/24 + (61-58T+T^2+600C-330e^2)A^6/720]$ $N = a/(1-\varepsilon^2 \sin^2 \phi)^{1/2}$ $T = \tan^2 \phi$ $C = \varepsilon^2 \cos^2 \phi$ $A = (\lambda - \lambda_0)\cos \phi$

METHOD FOR EFFICIENTLY TRANSFORMING A RASTER IMAGE FROM ONE MAP PROJECTION TO ANOTHER MAP PROJECTION

CROSS-REFERENCE TO RELATED APPLICATIONS

This Application is a nonprovisional application of provisional application 60/774,807 filed on Feb. 10, 2006 under 35 USC 119(e), the entire disclosure of which is incorporated by reference herein.

BACKGROUND

Geospatial representations of the three dimensional earth are produced in two dimensions, and must be projected into a two dimensional plane. Various projections are suitable, depending on the purpose of the map.

Much of the source material for cartographic applications is made available in the Universal Transverse Mercator (UTM) projection. The U.S. Geological Survey currently supplies Digital Orthographic Photo Quads (DOQ) and Topographic Quads in this projection. However, other cartographic materials are provided in other projections. A common projection format is Geodetic projection.

Geospatial data can be stored in raster format or vector format. In vector format, the cartographic features are typically provided with explicit coordinates. Digital images are typically stored in raster format. Raster or image data is composed of individual pixels with implicit coordinates determined by the projection employed at the creation of the image and any corner coordinates or other georeferencing information.

To transform vector data from one map projection into another map projection type, only the coordinates of the features must be manipulated. To transform raster or image data from one map projection into another map projection type, every pixel is remapped.

A set of equations for transforming UTM data to Geodetic data and Geodetic data to UTM data is provided in J. Snyder, "Map Projections—A Working Manual", U.S. Geological Survey Professional Paper 1395, United States Government Printing Office, Washington, 1987, also available online at http://onlinepubs.er.usgs.gov/djvu/PP/pp_1395.djvu.

Figure 1:
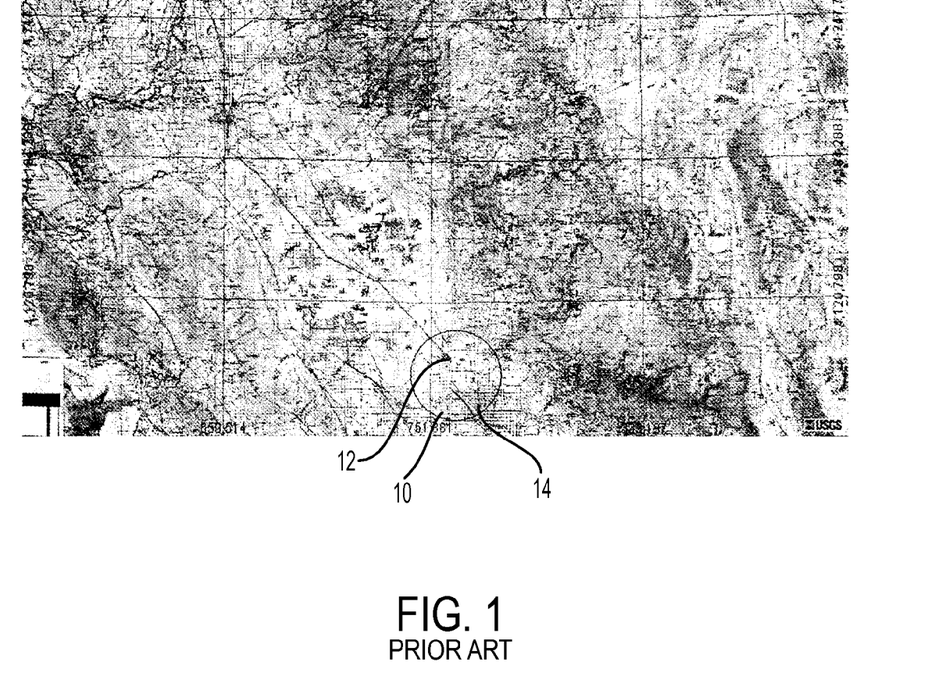
FIG. 1 is a map image generated with a prior art rubber sheeting method.

One common method of transforming or "reprojecting" a georeferenced image is with a technique called "rubber sheeting". In rubber sheeting several control points are chosen from both the source and destination space and a linear transformation matrix defined. This technique works well when the transformation can be accomplished with a set of linear equations. In essence, rubber sheeting allows you to rotate, linearly stretch, and translate the source image. Unfortunately, the transformation from UTM to Geodetic is nonlinear. The result of rubber sheeting on UTM images can be visible discontinuities between adjacent reprojected images as shown in FIG. 1. For example, in the map region 10, the map shows a break between road segments 12 and 14 where adjacent map images meet. Where high levels of accuracy are required, rubber sheeting is not very appropriate for UTM to Geodetic reprojection.

S. Jain and T. Barclay describe a pointwise reprojection method for producing a Geodetic reprojection of an original UTM image in "Adding the EPSG:4328 Geographic Longitude-Latitude Projection to Terra Server", Technical Report MSR-TR-2003-56, Microsoft Research, Redmond, Wash., 2003. This method uses the Snyder equations and can be more accurate than the rubber sheeting method. Pointwise reprojection operates on each point, or pixel, in the image individually. The color of each pixel in the Geodetic image is determined by converting the pixel's coordinates to UTM, then assigning the color of the corresponding UTM image pixel to the Geodetic image pixel. This pixel by pixel approach becomes processor intensive for large images.

SUMMARY

An embodiment of the invention is directed to a method for reprojecting a raster image in a UTM projection into a Geodetic projection. The method includes precomputing UTM coordinates for a subset of the total number of pixels in a Geodetic image, and subsequently, for remaining pixels in the Geodetic projection image, finding the UTM coordinates of a pixel by linear interpolation using the precomputed UTM coordinates of the nearest surrounding precomputed pixels.

The method can further include setting an initial size of the subset of pixels to be computed, testing the accuracy of linear interpolation with the initial size, and increasing the size of the subset if necessary.

The method can also include assigning a color to a pixel in the Geodetic image based on the color of at least one pixel in the UTM raster image. Color can be assigned to a pixel in the Geodetic image using bilinear interpolation with color values of four closest UTM pixels.

The raster image in the UTM projection can be a U.S. Geological Survey digital orthoquad photograph, and can be a photograph of a portion of the Earth.

In embodiments in which the UTM map projection image has fiducials, the method also includes cropping the UTM image to the area within the fiducials. The method can also include generating the empty Geodetic image by converting each of the four pixels at the fiducial points to Geodetic coordinates. The method can also include defining the corners of the empty Geodetic image as the Geodetic coordinates of a minimum bounding box around the Geodetic coordinates of the fiducials.

In embodiments of the invention, the method can include outputting the Geodetic image to a printer, saving the Geodetic image as a file to a storage device, or outputting the Geodetic image to another program or device for further processing.

Other embodiments are directed to a method for reprojecting a raster image in a first map projection into a second map projection. The method can include precomputing coordinates in the first map projection for a subset of the total number of pixels in an empty second map projection image, and subsequently, for each of the remaining pixels in the empty second projection image, finding the first map projection coordinates of that pixel by linear interpolation using the precomputed first map projection coordinates of the nearest surrounding precomputed pixels.

The method can also include setting an initial size of the subset of pixels to be computed, testing the accuracy of linear interpolation with the initial size, and increasing the size of the subset if necessary.

The method can also include assigning a color to a pixel in the second map projection image based on the color of at least one pixel in the first map projection image.

Assigning a color to a pixel in the second map projection image can be accomplished through bilinear interpolation with color values of four closest first map projection pixels.

The raster image in the first map projection can be a photograph of a portion of the Earth. The first map projection image can have fiducials, and the method can also include cropping the first map projection image to the area within the fiducials. The empty second map projection image can be generated by converting each of the four pixels at the fiducial points to second map projection coordinates. The method can also include defining the corners of the empty second map projection image as the second map projection coordinates of a minimum bounding box around the second map projection coordinates of the fiducials.

The method can also include outputting the second map projection image to a printer, saving the second map projection image as a file to a storage device, outputting the second map projection image to another program or device for further processing.

Embodiments of the invention are directed to a software program for converting an image from a first map projection to a second map projection image, the software configured to: precompute coordinates in the first map projection for a subset of the total number of pixels in an empty second map projection image; and subsequently, for each of the remaining pixels in the empty second projection image, find the first map projection coordinates of that pixel by linear interpolation using the precomputed first map projection coordinates of the nearest surrounding precomputed pixels.

DETAILED DESCRIPTION OF EMBODIMENTS OF THE INVENTION

Aspects of the invention are directed to a method and system for combining cartographic materials from differing projections into a composite map in a single projection. For example, the U.S. Geological Survey orthographic photo quads (DOQs) are provided in the Universal Transverse Mercator (UTM) projection but the Geodetic projection is more readily displayed by many Geospatial Information System software packages. Aspects of the invention are directed to efficient methods for converting images from one projection (e.g., the USGS DOQ in UTM projection) into another projection (e.g., the Geodetic projection). Once converted into Geodetic projection, the USGS DOQ can be combined with vector features such as roads and water features.

Normally, adjacent USGS DOQ images overlap each other somewhat. The DOQ images contain special markers called fiducials or corner points whose coordinates are usually given in the header files accompanying the images. These fiducials appear as crosses embedded in the images. The fiducials are used to align adjacent images when forming mosaic images from a number of DOQ images.

Figure 2A:
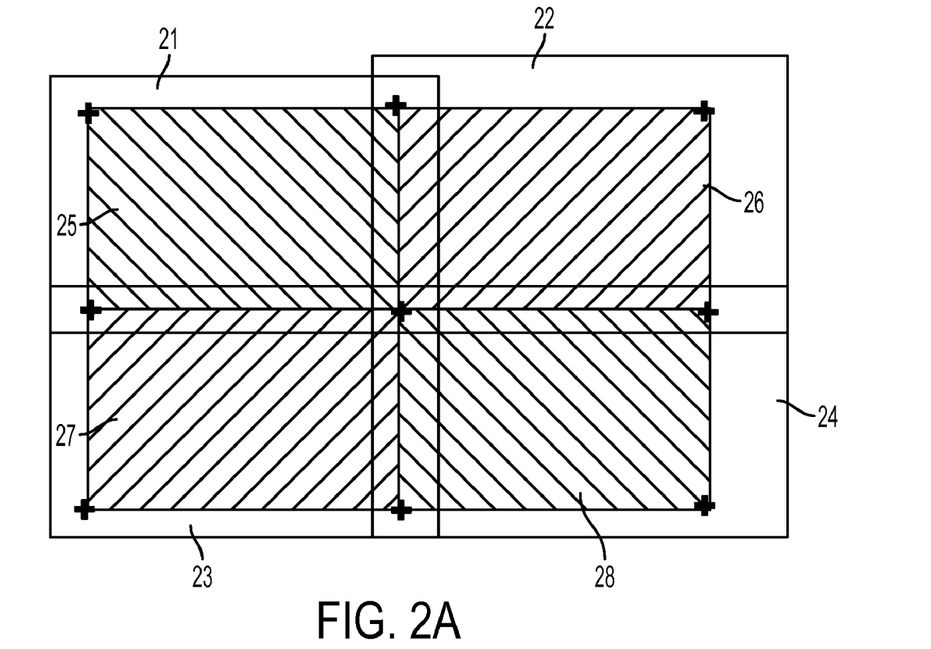
FIG. 2 illustrates the use of fiducial points in USGS digital orthoquad images to reduce the number of conversions in accordance with an embodiment of the invention.
Figure 2B:
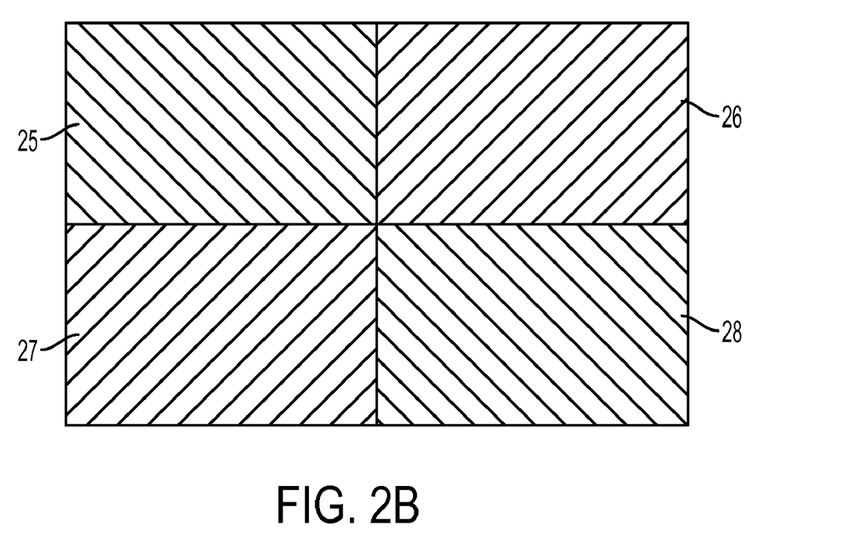

As illustrated in FIG. 2, if the USGS DOQ images 21, 22, 23, and 24 are cropped along the border defined by the fiducials then the overlap between adjacent images is completely removed. If properly converted from UTM to another projection, the images should look continuous but have no overlap after being cropped on the fiducials.

An embodiment of the invention is directed to a technique for using the fiducials are used to decrease the processing time of the images. More specifically, for each image, only those pixels that are within the rectangle defined by the four fiducial points are converted from the UTM to the Geodetic projection. In FIG. 2, the shaded area 25 illustrates the reduced portion of image 21 within the fiducials that will be converted. In some cases, almost 25% of each image will not be converted. In contrast, if each pixel within each image were converted before cropping along the fiducials is accomplished, many unnecessary pixels would be converted. Notice that the areas 25, 26, 27, and 28 inside the fiducials in each image form adjacent images with no overlap after the original images are cropped.

Another aspect of the invention is directed to an efficient pointwise transformation method for converting images from one projection to another projection. The following example discusses converting an image from the UTM to a Geodetic projection, although the method is suitable for conversions between other projections.

Point wise transformation from a UTM image to a Geodetic projection first creates an empty Geodetic image to provide the pixels used in later steps.

Figure 3A:
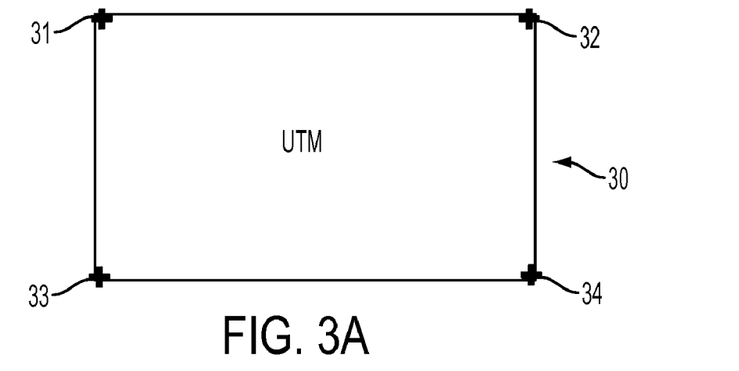
FIGS. 3A, 3B, and 3C illustrate steps in forming a geodetic image from an image in a Universal Transverse Mercator projection in accordance with an embodiment of the invention.
Figure 3B:
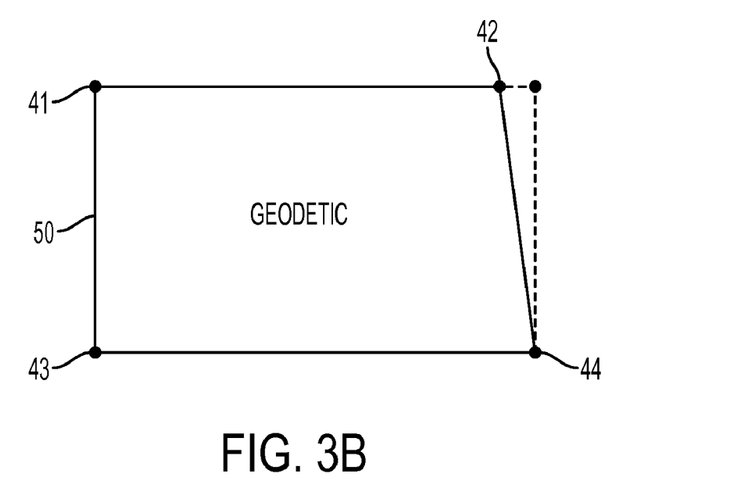
Figure 3C:
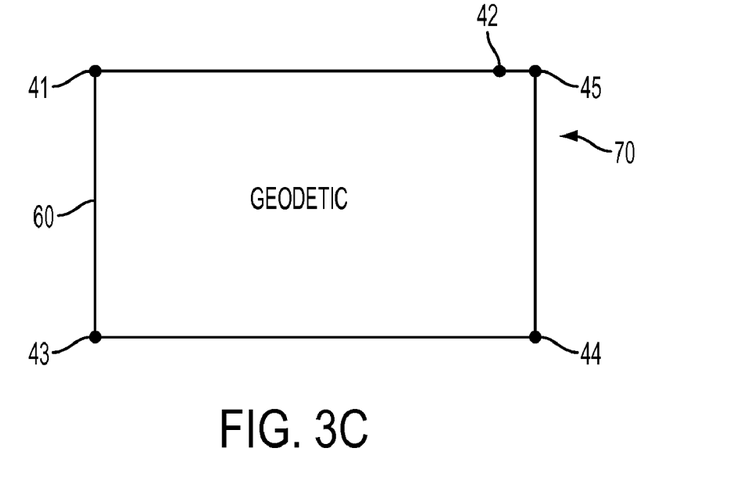

First, a pointwise transformation is used to transform the corner points of a UTM image. The UTM corner points can be the fiducial points of the USGS DOQ, as discussed above, or any four suitable points of the UTM image. FIG. 3A illustrates the corner pixels 31, 32, 33, and 34 of a UTM image 30. Each corner point 31, 32, 33, and 34 of the UTM image 30 is converted into a Geodetic point using the equations of FIG. 4A to create an empty Geodetic image for subsequent steps. The Geodetic points 41, 42, 43, and 44 that result from this conversion form the four corners of a new quadrilateral 50 in Geodetic projection, shown as a solid line in FIG. 3B. The quadrilateral 50 is likely to be non-rectangular. As seen in FIG. 3C, a rectangular minimum bounding box 60 is defined around the quadrilateral 50. The minimum bounding box 60 defines the bounds of the image in Geodetic projection that will be created from the original UTM image. The corner points 41, 43, 44, and 45 of the minimum bounding box 60 are projected into Geodetic coordinates (lat, long) using suitable conversion equations, such as the Snyder conversion equations shown in FIG. 4A.

Figure 4A:
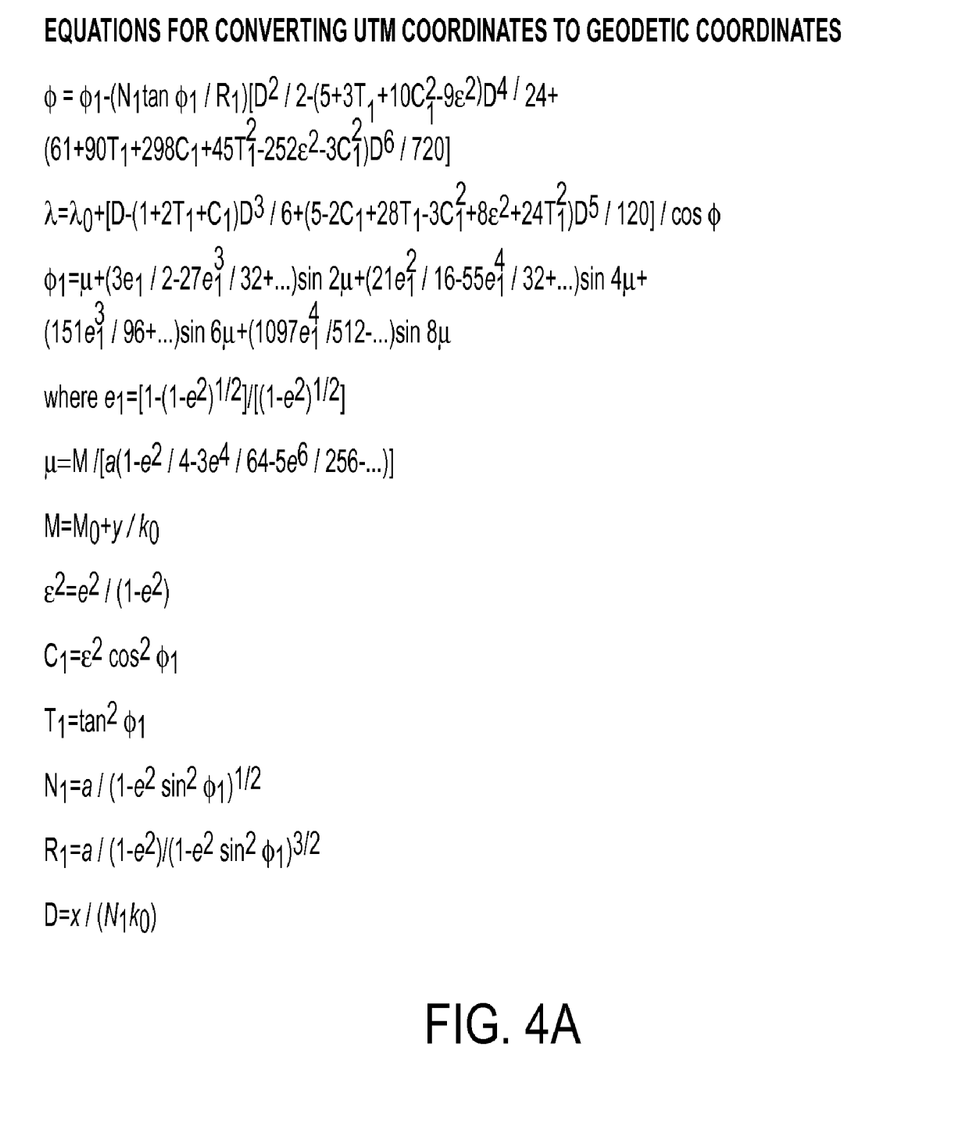
FIG. 4A provides equations for converting the coordinates of a point from a Universal Transverse Mercator projection to a Geodetic projection.
Figure 4B:
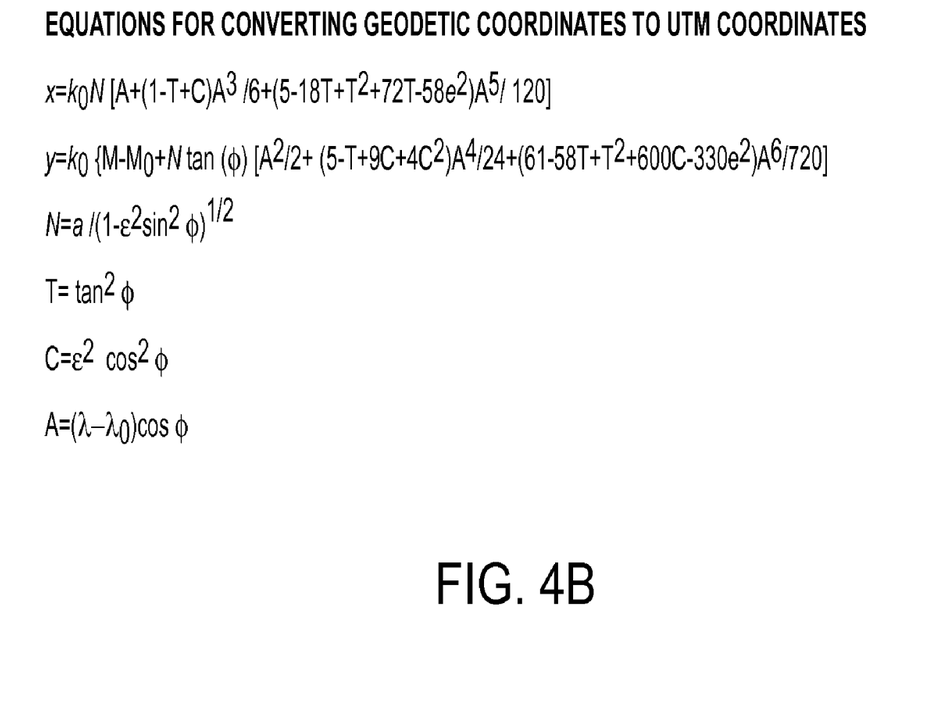
FIG. 4B provides equations for converting the coordinates of a point from a Geodetic projection to a Universal Transverse Mercator projection.

In the equations of FIGS. 4A and 4B, the variables x and y refer to rectangular coordinates of a point, $k_0$ is the scale of the central meridian and has a value of 0.9996 for UTM, $\phi$ is the geodetic latitude in radians, $\lambda$ is the geodetic longitude in radians, a is the semimajor axis of the WGS84 ellipsoid and has a value of 6378137.0, and M is the distance along the meridian from the Equator to latitude $\phi$. $M_0$ is the value of M calculated for $\phi_0$ (a reference meridian). The quantity $\epsilon$ is defined as $\epsilon^2 = e^2/(1-e^2)$, where $e = 0.0818192180$ is the eccentricity of the WGS84 ellipsoid. The power series expansion for the values of $\mu$ and $\lambda$ can be truncated after a suitable number of terms.

Note that both the UTM and Geodetic coordinates are real numbers. Images are composed of pixels which have integer coordinates (e.g., (1,1)). Therefore, the location points of the four corners of the empty Geodetic image are also approximated to integer coordinates in order to map the specific pixel location in the image. The integer coordinates have a minimum value of zero. This point to pixel conversion is done in addition to the projection conversion from UTM to Geodetic. To accomplish the point to pixel conversion, the dimensions of the bounding Geodetic bounding box (in degrees) are divided by the dimensions of the UTM image (in pixels) to produce a point per pixel ratio which is used to determine the dimensions of the empty Geodetic image.

In addition, in the USGS DOQs and some other images, the georeferenced coordinates put the origin of an area at the lower left corner. In contrast, digital images, and the programming language which operate on them, typically specify the origin to be the upper left pixel. The conversion from georeferenced coordinates to pixel coordinates can also include steps to account for this difference.

For each of the corner points in the new Geodetic image, the data, e.g., the color, from the corresponding original UTM image is assigned to or "fills in" the corner pixels in the new Geodetic image.

Once the corner points of the Geodetic image have been defined, the remaining image pixel coordinates can be converted, and the data from the original UTM image pixels can fill in the pixels in the UTM image, creating a completely reprojected image.

A more efficient method includes precomputing the conversion equations for a subset of the pixels in the UTM image and uses interpolation to fill in the remaining pixels in the new Geodetic image.

As one example, for a USGS DOQ, a 300×300 table of pixels approximately equally spaced between the corner pixels of the Geodetic image can be filled with conversion values computed using the equation of FIG. 4B, or other suitable conversion equations. Once the table is precomputed, the remaining empty Geodetic pixel coordinates are converted to UTM coordinates as follows.

Figure 5:
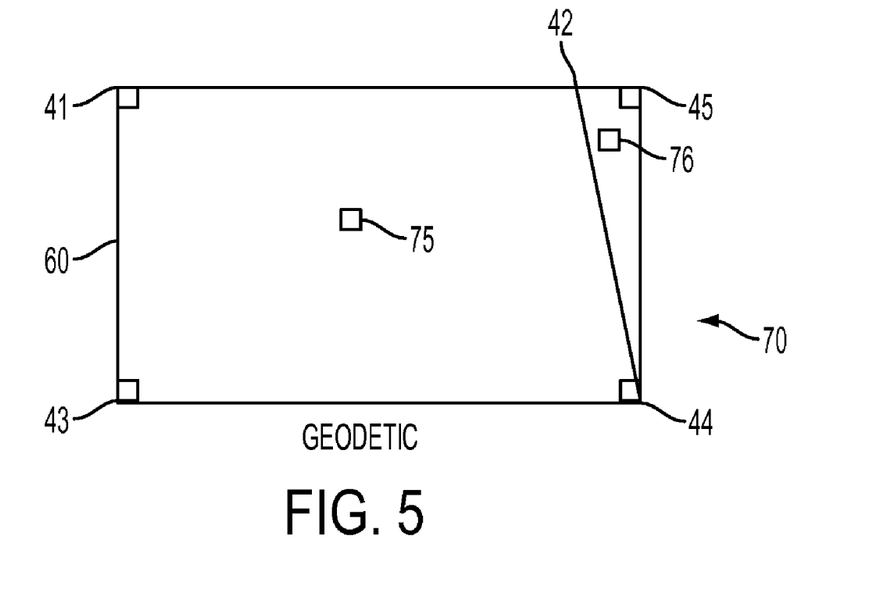
FIG. 5 and FIG. 6 illustrate steps for converting data in a UTM projection image to a Geodetic projection image.

As illustrated in FIG. 5, for an Geodetic image 70 converted from the an original UTM image, a pixel is selected and the georeferenced (e.g., Geodetic) coordinates of that pixel are calculated.

Next, it is determined whether the coordinates of the pixel are within the Geodetic quadrilateral 50 defined by the original conversion of the UTM image fiducials into Geodetic coordinates. If the coordinates are not within the bounds of the Geodetic quadrilateral 50, then the pixel 75 is made transparent or a default color. For example, pixel 76 is outside the quadrilateral 50, so will be assigned a transparent or default color. If the Geodetic coordinates of a pixel 75 are within the quadrilateral, then a check is made to determine if its coordinates are in the table of preconverted values. If so, then conversion of that pixel's coordinate was previously accomplished when the table was formed and is not necessary.

If the pixel's 75 coordinates are not in the table of preconverted values, linear interpolation is used to find the UTM coordinate of the Geodetic pixel currently being transformed. The linear interpolation used to determine the UTM coordinates of a geodetic point is done separately for the horizontal and vertical components of the point. The basic procedure for determining the horizontal component of a geodetic point is as follows:

1. Find the surrounding geodetic points in the table of preconverted values.
2. Get the UTM coordinates of those points from the table.
3. Let x(0,0)=the UTM horizontal coordinate of the lower point.
4. Let x(1,0)=the UTM horizontal coordinate of the upper point.
5. Let a=horizontal distance between the point and x(0,0), with the distance between the upper and lower points normalized to [0, 1].
6. $x_{UTM} = (1-a) x(0,0) + x(1,0)$ The result $x_{UTM}$ is the horizontal component of the UTM point. The vertical component can be calculated similarly with the equation $x_{UTM} = (1-b) x(0,0) + x(0,1)$, where "b" is the vertical distance from f(0,0) of the new UTM point (normalized between 0 and 1).

The accuracy of the conversion using the table is high. Evaluation of this technique shows that approximately 1 cm of error is obtained on USGS DOQs with a default sized 300×300 table. The USGS DOQs have a 1 m per pixel resolution, so the error from approximating transformation is estimated to be less than ½ m. An accuracy check can also be included that incorporates an accuracy check that determines if the table is within the 1 m of error for the current image. If the error is greater than allowed, the software increases the dimensions of the table until there is less than 1 m of error. Given the current performance of reprojection using the table approximation, the default table is believed to be adequate for most applications.

The dimensions of the table can also be decreased, in order to speed up the conversion. A reduction in accuracy can acceptable for some applications if the performance of the reprojection increased. However, creating the transformation table requires a certain amount of processor overhead regardless of the size of the table. The time to create 300×300 default table is not significantly larger than a 100×100 table. A significant reduction in creation time would require a large dimension decrease. Such a drastic change in the size of the table would incur an accuracy loss out of the acceptable range for most applications.

Figure 6:
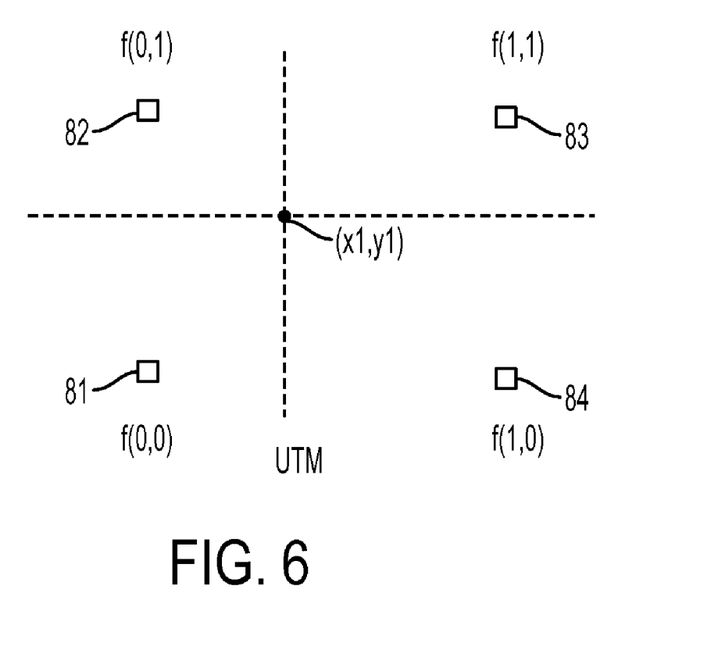

Once a pixel's geodetic coordinates have been converted to UTM coordinates is complete, the Geodetic image can be filled with data as illustrated in FIG. 6.

As discussed above, once the pixel's UTM coordinates have been determined, if the Geodetic pixel's 75 UTM coordinates correspond to a pixel in the UTM image (e.g., if the UTM coordinates are integers), the data (e.g., color) from that UTM image pixel is assigned to the Geodetic pixel 75.

However, in some cases the UTM coordinates (x1, y1) of the pixel 75 will not convert to a pixel location in the UTM image. For example, in FIG. 6, the nearest surrounding pixels 81, 82, 83, and 84 form a bounding box around the UTM coordinates x1, y1 of the Geodetic pixel 75.

One option is to round the newly calculated UTM coordinates (x1, y1) of the UTM point 81 to the nearest pixel 82 of the four pixels of the bounding box. The color value of the nearest pixel 82 is then assigned to the corresponding Geodetic pixel 75.

Another option is to average the four closest UTM pixels together and use the resulting average color value as the new value for the Geodetic pixel. The original UTM point 81 with UTM coordinates (x1, y1) has four bounding pixels (closest surrounding precomputed pixels). A weighted average color value can be found through a bilinear interpolation equation:

f(a, b)=(1−a)(1−b)f(0,0)+a(1−b)f(1,0)+(1−a)bf(0,1)+a bf(1,1), where f(0,0) is the color of lower left bounding pixel 81, f(0,1) is the color of upper left bounding pixel 82, f(1,1) is the color of upper right bounding pixel 83, and f(1,0) is the color of lower right bounding pixel 84, "a" is the horizontal distance from f(0,0) of the new UTM point (normalized between 0 and 1), and "b" is the vertical distance from f(0,0) of the new UTM point (normalized between 0 and 1). The result, f(a,b), is assigned as the color value of the Geodetic pixel.

The color value for each pixel can be encoded as an RGB (red, green, blue) integer, or by any other suitable encoding scheme. In the RGB integer encoding scheme, the separate red, green, and blue values are each a color band. The bilinear interpolation is performed for each separate color band of the pixel. Next, the color bands are recombined after interpolation to represent the complete color of the Geodetic pixel. This bilinear interpolation method produces high detail and accurate colors in the reprojected images, and can be noticeably better than the method of rounding the UTM point to the nearest pixel and assigning the color value of the nearest pixel to the corresponding Geodetic pixel.

This process of assigning color values to the Geodetic image pixels is repeated until all the pixels in the Geodetic image have assigned color values.

The reprojection methods described above work well. The transformed images combine with other Geodetic features correctly: roads and rivers in the reprojected images overlap with the Geodetic road and river features. The optimizations using a table and fiducials increase performance speed substantially.

Figure 7:
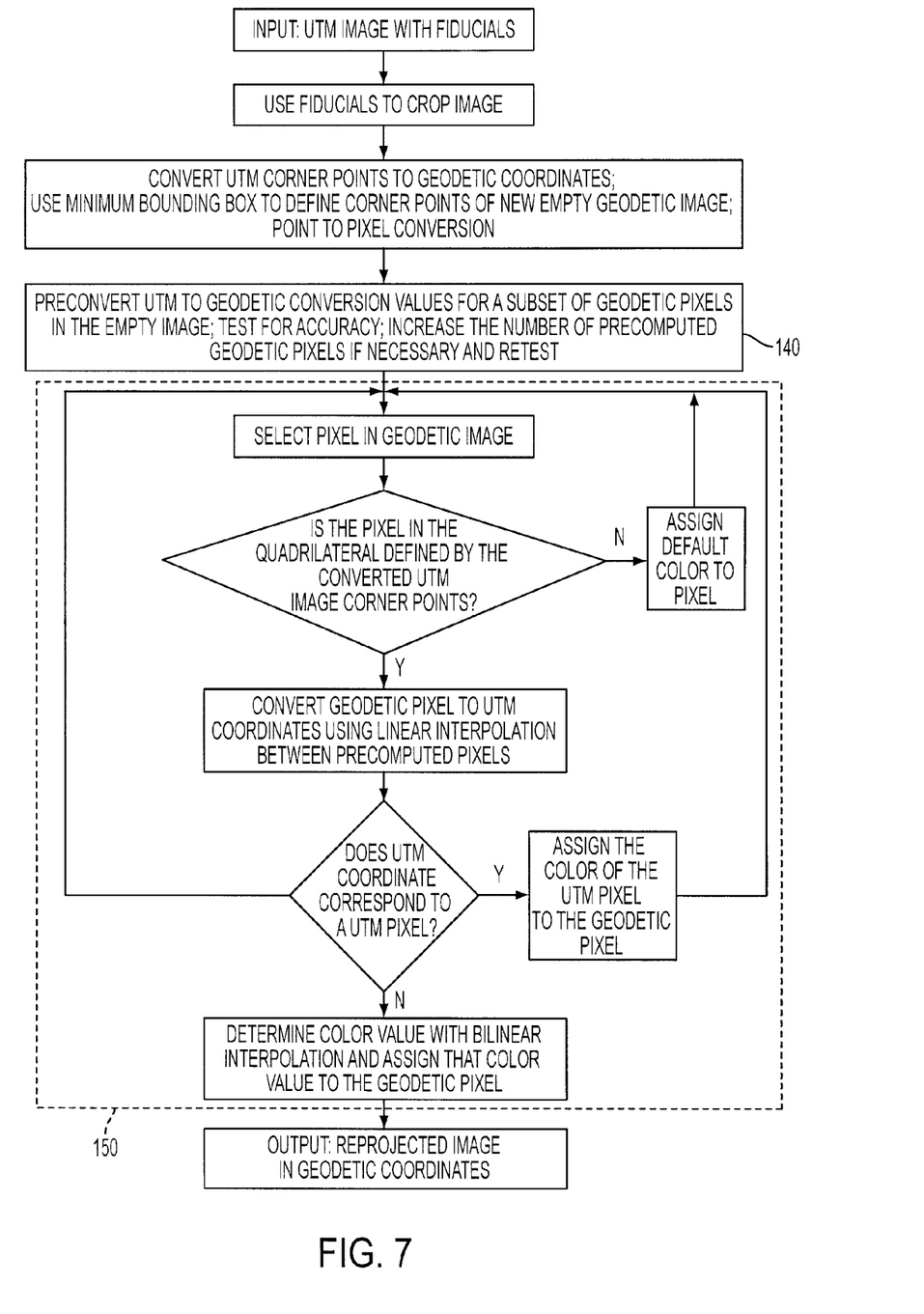
FIG. 7 is a flow chart showing an exemplary method in accordance with an embodiment of the invention.

FIG. 7 summarizes the pointwise transformation method for converting images from an UTM projection to a Geodetic image.

Note that the size of the table used for linear interpolation is tested 140 to determine whether the number of precomputed points will provide a sufficiently accurate result. Testing is accomplished after an initially selected number of precomputed points have been precomputed. For example, if an initial table size of 300×300 pixels has been precomputed, linear interpolation is used to find the horizontal and vertical UTM coordinates of at least one other pixel in the empty geodetic image. The Synder equations of FIG. 4B are then used to find the horizontal and vertical coordinates of these pixels, and the error between the results is found. If the error is too large, a larger subset pixels to precompute is selected, and the precompute-and-test process is repeated until the error is sufficiently small.

The table below shows the run times in seconds for reprojection with the various optimizations, using a Pentium III 927 Mhz computer with 512 MB of RAM. Run times are expected to be shorter with a faster computer and more memory.

|  | No optimization | Table | Fiducials | Table and Fiducials |
| --- | --- | --- | --- | --- |
| Trial 1 | 608.17 | 500.65 | 477.13 | 368.80 |
| Trial 2 | 603.68 | 501.21 | 475.88 | 368.55 |
| Trial 3 | 607.36 | 500.72 | 476.58 | 370.88 |
| Trial 4 | 606.74 | 505.35 | 475.83 | 369.5 |
| Trial 5 | 605.23 | 501.29 | 475.66 | 368.61 |
| Trial 6 | 606.24 | 501.84 | 476.22 | 369.27 |
| % Decrease in run time | 0.00% | 17.22% | 21.45% | 39.09% |

Figure 8:
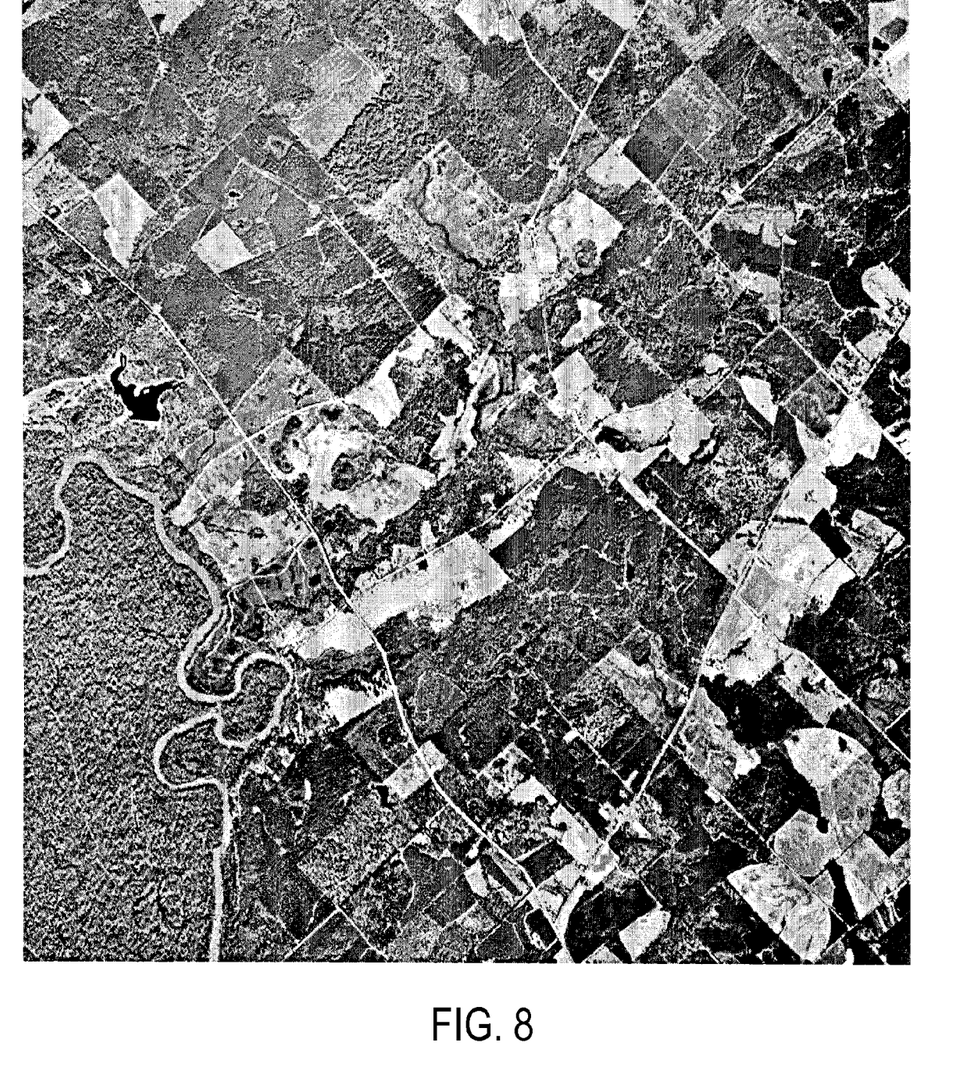
FIG. 8 is an original UTM projected image used to illustrate reprojection into a Geodetic projection.
Figure 9:
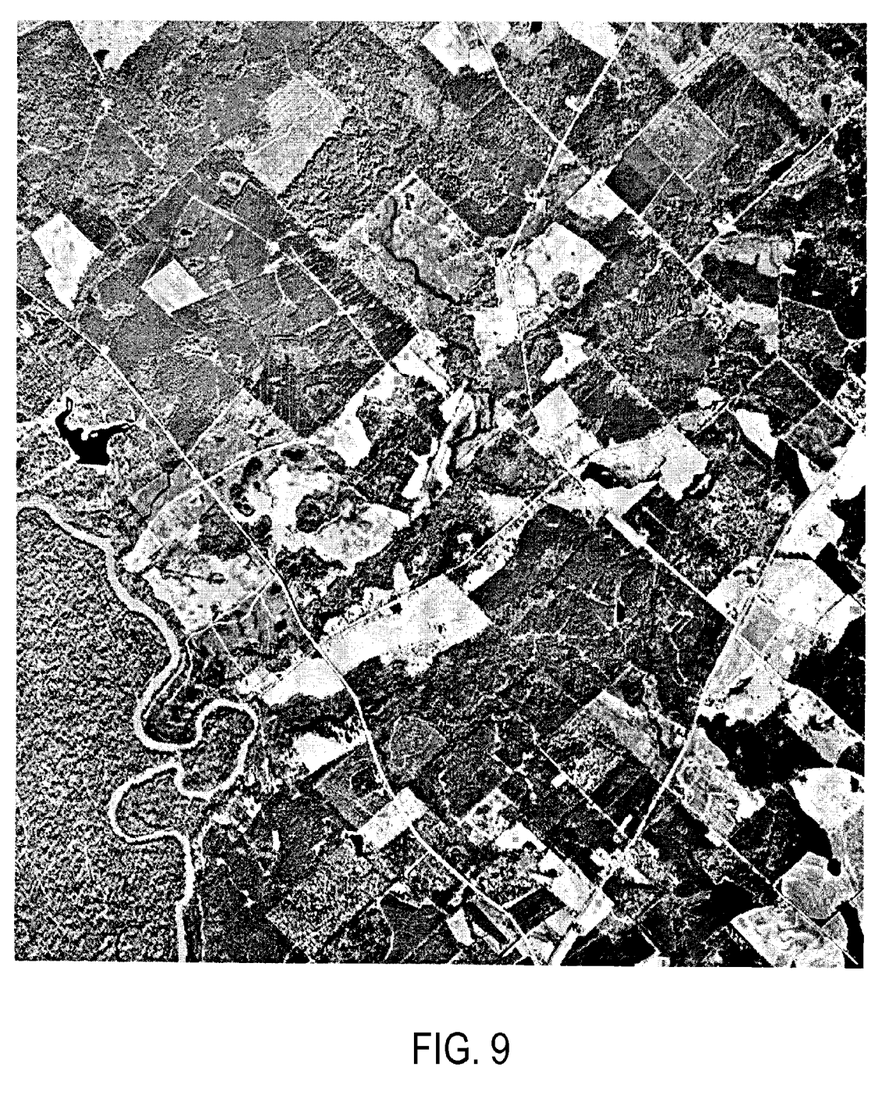
FIG. 9 is a reprojected image in a Geodetic map projection that shows the results of transformation using table approximation and using the fiducial boundaries in accordance with an embodiment of the invention.
Figure 10:
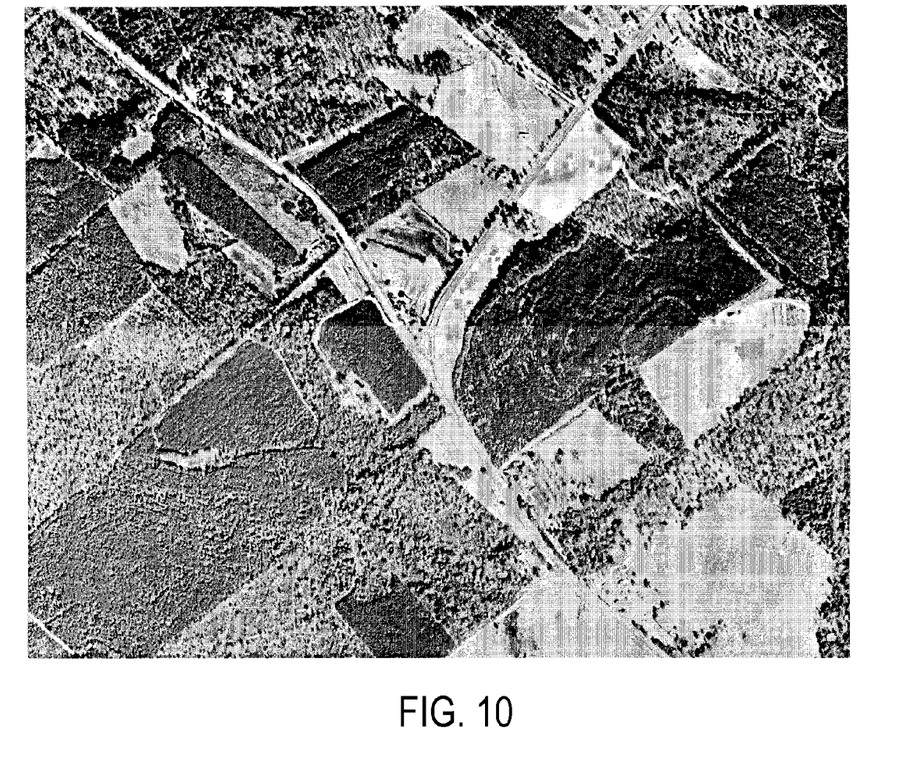
FIG. 10 shows a section of two adjacent images that have been reprojected into a Geodetic projection using table approximation and using the fiducial boundaries in accordance with an embodiment of the invention.

Several figures are provided to show the results of the reprojection techniques described herein. FIG. 8 is an original UTM projected image. The times shown in the table above refer to the reprojection of the image in FIG. 8. The transformation does change the image drastically. FIG. 9 shows the results of transformation using table approximation and using the fiducial boundaries. The image is visually very similar to the original. There is noticeable cropping because only the area within the fiducials was transformed. However, the effects of reprojection are barely noticeable. A slight change in the angles of lines, like roads, is probably the most noticeable difference. Of course, little change is desirable; reprojection is not supposed to change the content of the images. FIG. 10 is a good example of the accuracy of this method. This figure shows a section of two adjacent images. Notice the continuity between the roads in the two images. One can compare the accuracy of this image to FIG. 1, where there was a large discontinuity in the road that traverses two adjacent images. The ability to preserve continuity between images is an advantage of the point-wise reprojection methods.

A software program that incorporates this method has successfully converted all 4000 DOQs of the state of Georgia. Note that the time to accomplish pointwise reprojection of USGS images using the methods described herein is faster than pointwise transformation using only the Snyder equations without the fiducial and table optimizations. Using a compiled programming language like C is believed to speed up the transformations and may allow for on-demand processing on a fast server.

The method described in this paper is not specific to UTM to Geodetic transformations. It includes tranforming images between any two projections for which accurate point transformations can be made, such as, for example, Transverse Mercator, Lambert Polyconic, Polar Steriographic, Equidistant Azimuthal, Cylindrical Equal Area, Behrmann Cylindrical Equal-Area, Gall's Stereographic Cylindrical, Peters, Mercator, Miller Cylindrical, Oblique Mercator, Mollweide, Robinson Projection, Sinusoidal Equal Area Projection, Albers Equal Area Conic, Equidistant Conic, Lambert Conformal Conic, Polyconic, Azimuthal Equidistant, Lambert Azimuthal Equal Area, Orthographic, Stereographic, Space Oblique Mercator, Gnomonic, and Bipolar Oblique Conic Conformal.

In exemplary embodiments, the methods include conversion of maps or other raster or gridded images of portions of the earth. The images can include data from sensors located on aircraft, satellites, ships, or other platforms or vehicles. The data can be retrieved from databases and stored in various forms including on film, in magnetic, mechanical, optical, magnetic, or other media. Nor is this method limited to earth projections. The method can be used for any nonlinear transformation of an image.

The methods can also encompass additional steps to process raw images or data into images having a particular map projection prior to conversion to a second projection. The types of images are not limited to photographs, but can also include any geospatial data set having data associated with pixels in a map projection image. Such data includes but is not limited to radar or sonar data or data from other physical sensors that is in an image format or that can be transformed into an image format.

The type of data associated with the image pixels is not limited to color, but can be intensity, temperature, or various other physical measurements or representations thereof.

The methods described herein provide transformed images in a second projection suitable for being combined with adjacent images to form an image mosaic of portions of the earth or other region. The method can also encompass storing the reprojected image, producing a display of the reprojected image, or sending the image to an output device such as a printer or to another user for further processing. The method can also include conventional steps to join the adjacent images and store, display, or further transmit the resulting mosaic image.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, C, C++, Java, Python and Perl. A compiled programming language such as C has speed advantages and can allow on-demand processing on a fast server, however, is not very portable between platforms. A Java implementation has the advantage of being easy to integrate with other image software, but is slow in processing large images.

Although this invention has been described in relation to several exemplary embodiments thereof, it is well understood by those skilled in the art that other variations and modifications can be affected on the preferred embodiments without departing from scope and spirit of the invention as set forth in the claims.

What is claimed as new and desired to be protected by Letters Patent of the United States is:

1. A method for reprojecting a raster image in a UTM projection into a Geodetic projection, the method comprising:
   a processor precomputing UTM coordinates for a subset of the total number of pixels in a Geodetic projection image, the subset having fewer pixels than the total number of pixels in the Geodetic projection image;
   setting an initial size of the subset of pixels to be precomputed;
   testing the accuracy of linear interpolation with the initially set size of the subset by, for at least one of the remaining pixels in the Geodetic projection determining an error by comparing the UTM coordinates found by the linear interpolation to directly calculated UTM coordinates for the same pixel and increasing the size of the subset if the error exceeds a predetermined value; and
   subsequently, for remaining pixels in the Geodetic projection image, finding the UTM coordinates of each pixel by linear interpolation using the precomputed UTM coordinates of the nearest surrounding precomputed pixels.

2. The method according to claim 1, further comprising:
   assigning a color to a pixel in the Geodetic image based on the color of at least one pixel in the UTM raster image.

3. The method according to claim 2, wherein assigning a color to a pixel in the Geodetic image includes using bilinear interpolation with color values of four closest UTM pixels.

4. The method according to claim 1, wherein the raster image in the UTM projection is a U.S. Geological Survey digital orthoquad photograph.

5. The method according to claim 1, wherein the raster image in the UTM projection is a photograph of a portion of the Earth.

6. The method according to claim 1, further comprising:
   outputting the Geodetic image to a printer, saving the Geodetic image as a file to a storage device, or outputting the Geodetic image to another program or device for further processing.

7. A method for reprojecting a raster image in a UTM projection into a Geodetic projection, wherein the UTM map a processor for projection image is a USGS digital orthoquad image and has fiducial markers, the method comprising:
   a processor precomputing UTM coordinates for a subset of the total number of pixels in a Geodetic projection image, the subset having fewer pixels than the total number of pixels in the Geodetic projection image;
   subsequently, for remaining pixels in the Geodetic projection image, finding the UTM coordinates of each pixel by linear interpolation using the precomputed UTM coordinates of the nearest surrounding precomputed pixels; and
   cropping the UTM image to the area within the fiducial markers before said precomputing UTM coordinates for a subset of the total number of pixels in the Geodetic projection image.

8. The method according to claim 7, further comprising:
   generating the empty Geodetic image by converting each of the four pixels at the fiducial markers to Geodetic coordinates.

9. The method according to claim 8, further comprising:
   defining the corners of the empty Geodetic image as the Geodetic coordinates of a minimum bounding box around the Geodetic coordinates of the fiducial markers.

10. A method for reprojecting a raster image in a first map projection into a second map projection, the method comprising:
   a processor precomputing coordinates in the first map projection for a subset of the total number of pixels in an empty second map projection image, wherein the subset has fewer pixels than the total number of pixels in the empty second map projection image;
   setting an initial size of the subset of pixels to be precomputed;
   testing the accuracy of linear interpolation with the initially set size of the subset by, for at least one of the remaining pixels in the second map projection determining an error by comparing the first map projection coordinates found by the linear interpolation to directly calculated first map projection coordinates for the same pixel and increasing the size of the subset if the error exceeds a predetermined value; and
   subsequently, the each of the remaining pixels in the empty second projection image, finding the first map projection coordinates of that pixel by linear interpolation using the precomputed first map projection coordinates of the nearest surrounding precomputed pixels.

11. The method according to claim 10, further comprising: assigning a color to a pixel in the second map projection image based on the color of at least one pixel in the first map projection image.

12. The method according to claim 10, wherein assigning a color to a pixel in the second map projection image includes using bilinear interpolation with color values of four closest first map projection pixels.

13. The method according to claim 10, wherein the raster image in the first map projection is a photograph.

14. The method according to claim 10, wherein the raster image in the first map projection is a photograph of a portion of the Earth.

15. The method according to claim 10, further comprising: outputting the second map projection image to a printer, saving the second map projection image as a file to a storage device, or outputting the second map projection image to another program or device for further processing.

16. A non-transitory computer readable medium storing computer readable instructions thereon for execution by a processor for converting an image from a first map projection to a second map projection image, the instructions comprising:

instructions for precomputing coordinates in the first map projection for a subset of the total number of pixels in an empty second map projection image, the subset having fewer pixels than the total number of pixels in the empty second map projection image;

instructions for setting an initial size of the subset of pixels to be precomputed;

instructions for testing the accuracy of linear interpolation with the initially set size of the subset by, for at least one of the remaining pixels in the second map projection determining an error by comparing the first map projection coordinates found by the linear interpolation to directly calculated first map projection coordinates for the same pixel and increasing the size of the subset if the error exceeds a predetermined value: and instructions for subsequently, for each of the remaining pixels in the empty second projection image, finding the first map projection coordinates of that pixel by linear interpolation using the precomputed first map projection coordinates of the nearest surrounding precomputed pixels.

17. The computer readable medium of claim 16, the instructions further configured to:
assign a color to a pixel in the second map projection image based on the color of at least one pixel in the first map projection image.

18. The computer readable medium of claim 16, wherein assigning a color to a pixel in the second map projection image includes using bilinear interpolation with color values of four closest first map projection pixels.

19. The computer readable medium of claim 16, wherein the first map projection image is a photograph.

20. The computer readable medium of claim 16, wherein the first map projection image is a digital orthoquad photograph.

21. A non-transitory computer readable medium storing computer readable instructions thereon for execution by a processor for converting an image from a first map projection to a second map projection image, the instructions comprising:

instructions for precomputing coordinates in the first map projection for a subset of the total number of pixels in an empty second map projection image, the subset having fewer pixels than the total number of pixels in the empty second map projection image; and instructions for subsequently, for each of the remaining pixels in the empty second projection image, finding the first map projection coordinates of that pixel by linear interpolation using the precomputed first map projection coordinates of the nearest surrounding precomputed pixels, wherein the first map projection image is a USGS digital orthoquad and has fiducial markers, and the instructions for cropping the first map projection image to the area within the fiducial markers before said precomputing coordinates in the first map projection for a subset of the total number of pixels in an empty second map projection image.

22. The computer readable medium of claim 21, wherein the instruction are further adapted to generate the empty second map projection image by converting each of the four pixels at the fiducial markers to second map projection coordinates.

23. The computer readable medium of claim 22, wherein the instructions are further adapted to define the corners of the empty second map projection image as the second map projection coordinates of a minimum bounding box around the second map projection coordinates of the fiducial markers.

* * * * *